March 27, 1962  G. BUDNICK  3,026,692

COUPLING FOR ANGLE TRANSMISSION

Filed Jan. 4, 1960

United States Patent Office 3,026,692
Patented Mar. 27, 1962

3,026,692
COUPLING FOR ANGLE TRANSMISSION
Gunther Budnick, deceased, late of Darmstadt, Germany, by Thea Budnick, legal representative, 191 Heinrichstrasse, Darmstadt, Germany
Filed Jan. 4, 1960, Ser. No. 376
Claims priority, application Germany Jan. 7, 1959
8 Claims. (Cl. 64—15)

This invention relates to a coupling for transmission of angle of turning of one shaft to another and without friction and practically free from error in the transmission of the turning motion.

It is a frequent problem to transmit the angular turning between two shafts with high accuracy especially when they are not in angular alinement or are limited in position to tolerances none too exacting.

For measuring work or use in measuring instruments the heretofore known yieldable couplings are much too inaccurate. There is another example using hinged shafts but these produce a force on the shaft and cause bending and are generally unsatisfactory. The known Oldham coupling is adapted for use when shafts to be coupled extend in the same direction and employs two slide ring-guide members perpendicular to each other. They do not operate free from friction and do not compensate for errors in angular displacement of the shaft axes. Also they permit play in the construction with reverse tension.

The present coupling avoids all the above disadvantages. It comprises essentially two spring-parallel constructions which are disposed to one another at 90° where the one parallel construction is connected to a drive member and a medium piece and the second parallel construction is connected to the medium piece and an output member.

Figure 1:
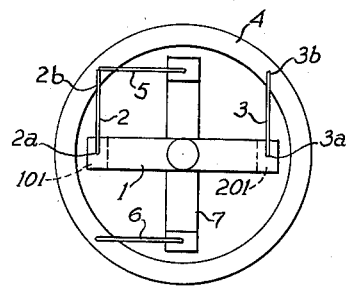
Figure 2:
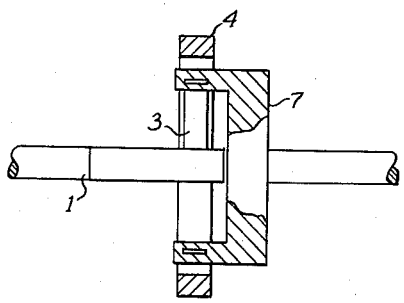
Figure 3:
Figure 4:
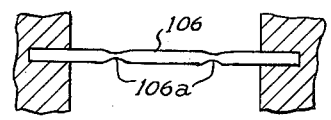
Figure 5:
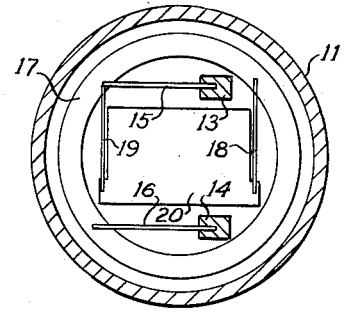
Figure 6:
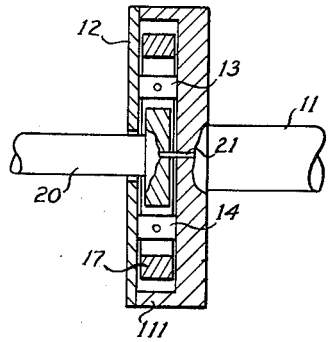

In the drawing the invention is schematically shown wherein FIGS. 1 and 2 show a coupling wherein the same angularity is preserved and having forked drive and driven parts. FIGS. 3 and 4 show two forms of spring elements, and FIGS. 5 and 6 show the coupling in a disc-form construction and again the same shaft angularity is preserved.

FIG. 1 shows a fork-shaped rotary member 1 having prongs or sides 101 and 201 on which are secured fast springs 2 and 3 respectively at respective ends 2a and 3a. Opposite ends 2b and 3b of the springs are secured fast to a ring 4, surrounding the prongs and springs, at the inner periphery of the ring, to form a parallel spring arrangement. The rotary drive member 1 rotates the ring 5 through means of the springs. Like springs 5 and 6 similarly secured to the ring and a driven fork-shaped member similar to member 1 and likewise surrounded by the ring, transmit motion of the ring to driven member 7.

The two parallel spring arrangements are at 90° with respect to each other as are the planes of the two fork-shaped members, that is to say, the springs lie on a rectangle.

If the springs are uniform blades such blade 6 in FIG. 3 and lie in planes to which the axis of the system is parallel, then only compensation for off-sets in shaft alinement is possible. In the case of shafts not angularly alined, the substitution of round bar springs as 106 preferably having weakened zones 106a obtains further required degrees of freedom. It is very desirable that in all cases the two parallel arrangements lie in a substantially single plane to which the axes of the members 1 and 7 are substantially perpendicular.

Spring elements with recesses as in FIG. 4 have a higher resistance to buckling and permit easier equalization for a given spring action. All springs should preferably be alike.

It is easy to understand that as long as the forked members and linkage constructions are manufactured sufficiently accurately, in the case of an off-set or shifting of shafts, no angular distortion and therefore no error of angle appears. By this, the forces required for deflection of the arrangement can, through preventive measures be held negligibly small. Consequently there is no sort of friction of deflection, likewise no play and no reverse tension.

A source of error can enter into the construction due to temperature change and variation of the spring elements. In production the springs will therefore preferably be of material having a negligible coefficient of expansion such as for example hair spring metal.

For the manufacture of the arrangement, new joining processes have been successful, such as the use of synthetic resins as adhesives for mounting the springs, in exactingly proper position by means of known types of gauges, and jigs.

FIGS. 5 and 6 show a further advantageous form of the invention, in which the flanged wheel or drive side member 11 of the coupling arrangement generally described in FIGS. 1 and 2 is provided with a cover disc 12. Between the member 11 and disc there are arranged, fixed on the member 11 or 12, transmission pieces 13 and 14 from which extend, for example, round rods 15 and 16 to a ring or apertured disc 17. From the ring the working force is transmitted by means of springs 18 and 19 to the output member 20. The wheel 11 is shown flanged at 111. For aiding maintenance of axial alinement a slender wire 21 may be provided substantially coaxial with the drive and out-put members and fast or loose thereon.

The coupling of FIGS. 5 and 6 has the advantage in that it is possible to hold the play of element 20 between the drive member and disc 12 so small that there is no plastic flow or deformation of the materials of construction.

The invention claimed is:

1. A coupling device for rotary shafts comprising a drive member; a driven member; a third member surrounding at least one of the other members; a first pair of parallel springs secured at their respective ends to the drive member and to the third member; a second pair of parallel springs secured at their respective ends to the driven member and the third member, the springs of the first pair making a 90° angle with those of the second pair, and all springs lying substantially in a common plane, the points of attachment of each pair of springs to the third member being at corners of a single base of a rectangle having such pair of springs at opposite sides of the rectangle.

2. A coupling device, as claimed in claim 1, said springs being blade springs.

3. A coupling as claimed in claim 1, said springs being round bars.

4. A coupling as claimed in claim 3 said bars having portions of reduced diameter to permit easier bending in all transverse directions.

5. A coupling as claimed in claim 1, said springs having a low coefficient of thermal expansion to prevent inaccuracies due to changes in temperature.

6. A coupling device for rotary shafts comprising a drive member; a driven member; a third member surrounding at least one of the other members; a first pair of parallel springs secured at their respective ends to the drive member and to the third member; a second pair of parallel springs secured at their respective ends to the driven member and the third member, the springs of the first pair making a 90° angle with those of the second pair, and all springs lying substantially in a common plane, one of the two first mentioned members having a peripheral flange, and a disc secured thereon and to the flanges to limit play in the direction of the axis of rotation of the coupling by the third member.

7. A coupling device for rotary shafts comprising a drive member; a driven member; a ring shaped third member surrounding at least one of the other members; a first pair of elongated resiliently bendable parallel bars secured fast at their respective ends to the drive member and to the third member; a second pair of elongated resiliently bendable parallel bars secured fast at their respective ends to the driven member and the third member, the bars of the first pair making a 90° angle with those of the second pair, the lengths of the bars of each pair being substantially equal and all bars normally lying substantially in a common plane, the points of attachment of each pair of bars to the third member being at corners of a single base of a rectangle having such pair of bars at opposite sides of the rectangle.

8. A coupling device for rotary shafts comprising a drive member; a ring shaped third member surrounding at least one of the other members; a first pair of elongated resiliently bendable parallel springs secured fast at their respective ends to the drive member and to the third member; a second pair of elongated resiliently bendable parallel springs secured fast at their respective ends to the driven member and the third member, the springs of the first pair making a 90° angle with those of the second pair, the lengths of the springs of each pair being substantially equal and all springs normally lying substantially in a common plane, said springs being mounted fast at their several ends to prevent loosening of the springs relative to any of said members by frictional wear and to tend to promote flexing of the springs away from their ends so that the third member will remain in substantially a common plane, and all springs being resiliently flexible round rods to permit bending in all directions with substantially the same amount of stress.

References Cited in the file of this patent
UNITED STATES PATENTS

| 1,764,348 | Rampacher | June 17, 1930 |

FOREIGN PATENTS

| 98,468 | Austria | Nov. 10, 1924 |
| 117,574 | Sweden | Nov. 5, 1946 |
| 549,858 | Great Britain | Dec. 10, 1942 |

UNITED STATES PATENT OFFICE
CERTIFICATE OF CORRECTION

Patent No. 3,026,692                  March 27, 1962

Gunther Budnick, deceased, by Thea Budnick, legal representative

It is hereby certified that error appears in the above numbered patent requiring correction and that the said Letters Patent should read as corrected below.

Column 3, line 20, after "drive member;" insert -- a driven member --.

Signed and sealed this 24th day of July 1962.

(SEAL)
Attest:

ERNEST W. SWIDER
Attesting Officer

DAVID L. LADD
Commissioner of Patents